United States Patent
Jaugilas et al.

(10) Patent No.: US 7,706,971 B2
(45) Date of Patent: Apr. 27, 2010

(54) SYSTEM AND METHOD FOR DATA MAPPING AND MAP DISCREPANCY REPORTING

(75) Inventors: John Jaugilas, Aurora, CO (US); Glade L. Hulet, Spanish Fork, UT (US)

(73) Assignee: The Boeing Company, Chicago, IL (US)

( * ) Notice: Subject to any disclaimer, the term of this patent is extended or adjusted under 35 U.S.C. 154(b) by 968 days.

(21) Appl. No.: 11/187,382

(22) Filed: Jul. 21, 2005

(65) Prior Publication Data

US 2007/0021908 A1    Jan. 25, 2007

(51) Int. Cl.
G01C 21/30 (2006.01)
(52) U.S. Cl. .................. 701/208; 340/995.1; 701/209
(58) Field of Classification Search .......... 701/208; 340/995.1
See application file for complete search history.

(56) References Cited

U.S. PATENT DOCUMENTS

| | | | | |
|---|---|---|---|---|
| 6,073,076 | A | 6/2000 | Crowley et al. | 701/208 |
| 6,208,934 | B1 | 3/2001 | Bechtolsheim et al. | 701/209 |
| 6,374,182 | B2 | 4/2002 | Bechtolsheim et al. | 701/209 |
| 6,438,561 | B1 | 8/2002 | Israni et al. | 707/104.1 |
| 6,600,992 | B2 | 7/2003 | Dow | 701/207 |
| 6,694,249 | B1 | 2/2004 | Anderson et al. | 701/120 |
| 7,222,017 | B2 * | 5/2007 | Clark et al. | 701/120 |
| 2003/0105581 | A1 | 6/2003 | Walter | 701/120 |
| 2004/0122590 | A1 | 6/2004 | Ito et al. | |
| 2004/0160354 | A1 * | 8/2004 | Coldefy et al. | 342/33 |

FOREIGN PATENT DOCUMENTS

| | | |
|---|---|---|
| DE | 100 30 932 A1 | 1/2002 |
| EP | 1 162 433 A1 | 12/2001 |
| EP | 1 172 632 A1 | 1/2002 |
| EP | 1172632 A1 * | 1/2002 |
| EP | 1 530 025 A2 | 5/2005 |
| EP | 1530025 A2 * | 5/2005 |
| GB | 2 405 204 A | 2/2005 |

OTHER PUBLICATIONS

International Search Report for PCT/US2006/028475; Dec. 12, 2006; 5 pages.

* cited by examiner

*Primary Examiner*—Mark Hellner
*Assistant Examiner*—Helal A Algahaim
(74) *Attorney, Agent, or Firm*—Armstrong Teasdale LLP

(57) ABSTRACT

Embodiments of the present invention generally relate to systems and methods for identifying and eliminating discrepancies in electronic maps. Embodiments of a method and system for correcting discrepancies in an electronic map includes receiving location information from one or more computing devices using the electronic map, identifying a discrepancy between the electronic map and the location information, and altering the electronic map to eliminate the discrepancy.

16 Claims, 7 Drawing Sheets

SYSTEM AND METHOD FOR DATA MAPPING AND MAP DISCREPANCY REPORTING

TECHNICAL FIELD

The present invention relates generally to mapping. More particularly, the present invention relates to the identification and amelioration of discrepancies in electronic maps.

BACKGROUND OF THE INVENTION

A great number of airplanes use the world's airspace to travel between locations. Many people use or prefer to travel by airplanes because of the speed and convenience of air travel. To provide for the air traffic, thousands of airports have been built around the world. Both large international airports, such as Denver International Airport, and smaller regional or private airports allow the ever-growing population of air travelers to take-off and land from nearly any region in the world.

Most all airports are generally arranged in the same manner. For example, each airport includes at least one runway that allows airplanes to take-off from or land at the airport. Generally, except in the most rudimentary airports, airports also include a network of taxiways that allow airplanes to travel between the runway(s) and other parts of the airport, such as the terminal or aircraft hangers. In many small airports, the taxiways are simple to navigate and follow. However, at larger airports that handle a larger volume of air traffic, the taxiways can become a complex and intertwined network of paths among and between the parts of the airport. In situations where the taxiways are complex and/or not well marked, pilots often require a map or an electronic navigation system to navigate the taxiways.

Several organizations supply airport maps or electronic navigation systems that provide maps of taxiways and runways at an airport. One type of airport map system is the Taxi Position Awareness (TPA) application of an Electronic Flight Bag (EFB) system provided by Jeppesen Sanderson, Inc. of Englewood, Colo. The EFB is a system that provides electronic information to the pilot, such as terrain information, navigation information, or telemetry about the airplane. The TPA shows a rendered version of the airport, with the runway and taxiways displayed on a computer monitor. Generally, the TPA is a "geo-referenced" map that can use the actual coordinates or position of the airplane, usually derived from a position sensor, such as a Global Positioning System (GPS), to display the location of the airplane on the taxiways or runways at any given time. In simple terms, a geo-referenced map provides a system for locating objects on the surface of the earth according to "real world" coordinates, such as latitude and longitude. For instance, a geo-referenced map can use the latitude and longitude of an object, such as an airplane, to display the airplane on the geo-referenced map in the same position as the airplane's actual, physical position on the surface of the earth.

To create the geo-referenced map in the TPA, a map creator receives a description or other information about the airport. In one situation, the map creator may receive a very detailed map generated from a highly accurate survey of the airport. These accurate maps can then be arranged in the geo-referenced, TPA map according to clearly indicated and known geographical markers or locations, such as section markers or other typical survey points. In some situations, the map creator receives the initial airport plans, which are then converted into an electronic map using the measurements provided in the plans. Generally, to enter into service, airports must provide or publish the locations of the ends of the runways so that the precise locations of the runway ends are generally known. The TPA maps may then be located and oriented according to the locations of the runway ends. The position and orientation of the remainder of the airport map is then generally oriented to the ends of the runways.

Unfortunately, prior maps suffer from a number of inaccuracies. For instance, the documents and plans provided to the map creator are often inaccurate or out-of-date. While the busiest airports in the world often have extremely accurate airport maps, smaller regional or lesser-used airports often have slightly inaccurate or outdated maps. In some situations, the positions, orientations, designations, or dimensions of the taxiways or other parts of the airport map may be skewed or rendered incorrectly when geo-referencing the airport plans. Such inaccuracies may cause pilots to become disoriented when taxiing to and from a runway. It is with respect to these and other considerations that the present invention has been made.

SUMMARY

Embodiments of the present invention generally relate to systems and methods for identifying and eliminating discrepancies in electronic maps. In one embodiment, a method for correcting discrepancies in an electronic map comprises receiving location information for one or more computing devices, such as an Electronic Flight Bag on an airplane, using the electronic map, identifying a discrepancy between the electronic map and the location information, and altering the electronic map to eliminate the discrepancy.

In another embodiment, a system for collecting discrepancy data about an electronic map comprises a position sensor that provides a location of a computing device, a mapping device that correlates the location of the computing device to a location on the electronic map, and a discrepancy device that determines a discrepancy between the actual, physical position of the computing device and the displayed location of the computing device on the electronic map.

In still another embodiment, a method for identifying a discrepancy in an electronic map comprises comparing an electronic map to a location of a computing device displayed on the electronic map, identifying a discrepancy between the actual, physical position of the computing device and the displayed position of the computing device on the electronic map, and reporting the discrepancy.

The invention may be implemented as a computer process, a computing system, or as an article of manufacture such as a map or a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The features, functions, and advantages can be achieved independently in various embodiments of the present inventions or may be combined in yet other embodiments. A more complete appreciation of the present invention and its improvements can be obtained by reference to the accompanying drawings, which are briefly summarized below, to the following detailed description of exemplary embodiments of the invention, and to the appended claims.

DETAILED DESCRIPTION OF THE INVENTION

The present invention will now be described more fully hereinafter with reference to the accompanying drawings, in which embodiments of the invention are shown. The invention may, however, be embodied in many different forms and should not be construed as limited to the embodiments set forth herein. Rather, these embodiments are provided so that the disclosure will be thorough and complete and will fully convey the scope of the invention to those skilled in the art.

Figure 1:
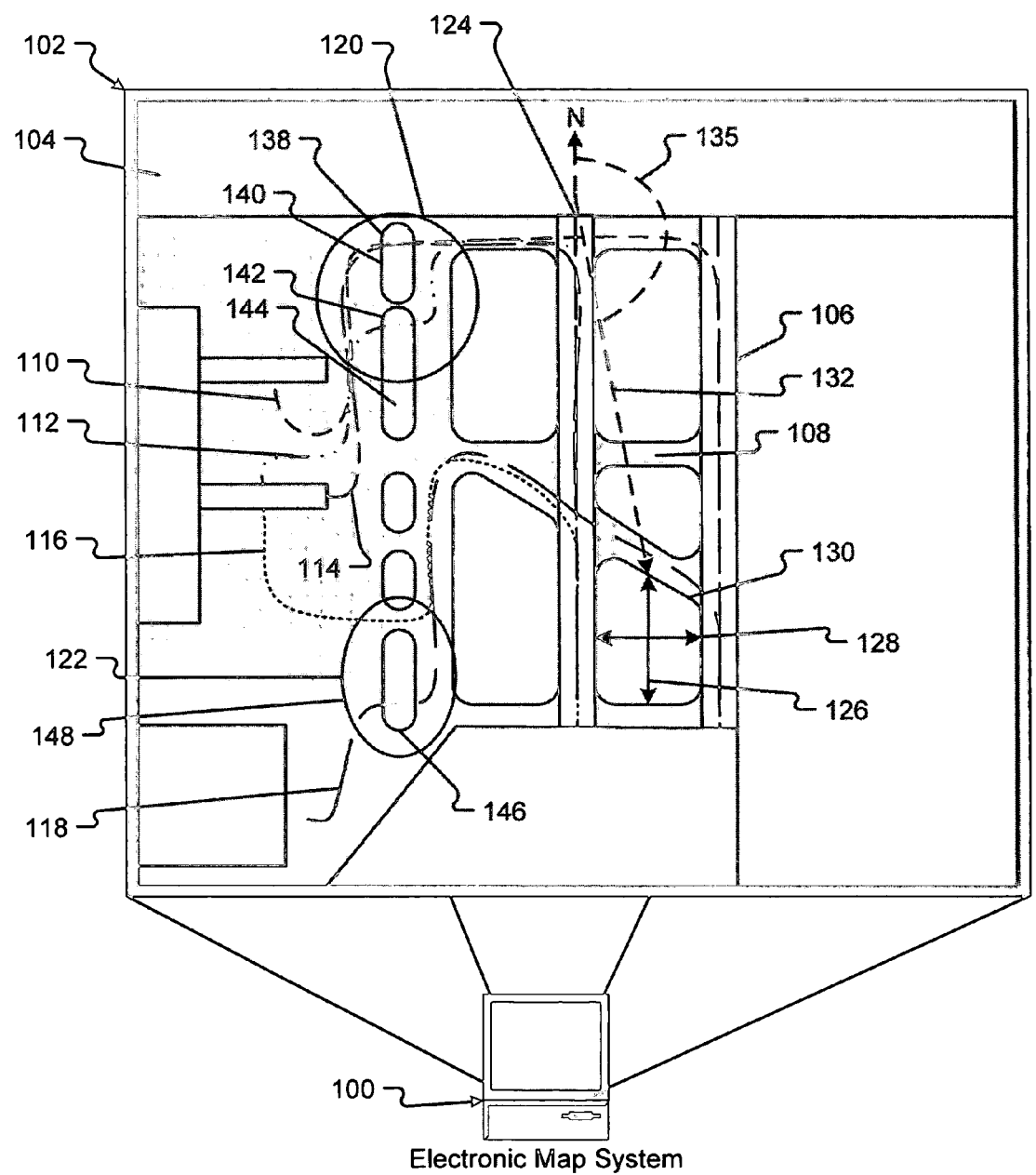
FIG. 1 is an advantageous embodiment of an electronic map system and an electronic map showing discrepancies that are eliminated according to the present invention.

Embodiments of the present invention relate to methods and systems that collect location data from one or more users of an electronic map, analyze the location data to identify discrepancies in the electronic map, and alter the electronic maps based on the location data. In one embodiment, an electronic map system 100 having a display 102 showing an electronic, geo-referenced map 104 is shown in FIG. 1. An exemplary map system is a Taxi Position Awareness (TPA) application of an Electronic Flight Bag (EFB) system provided by Jeppesen Sanderson, Inc. of Englewood, Colo. Importantly, although the display 102 illustrates a TPA application showing a geo-referenced, electronic map of airport runways 106 and taxiways 108, many other types of software applications may be used to both generate and display location data on an electronic map in accordance with the present invention. Thus, the example shown in FIG. 1 is not meant as a limitation, but merely as an illustration. Indeed, the present invention may also be used to improve the accuracy of navigation channels in certain waterways by monitoring the position of watercraft, or even to improve the accuracy of certain roadways by monitoring the position of automobiles.

One or more users of the electronic map system 100, such as airplanes equipped with an EFB system running a TPA application, may use the airport. Additionally, fuel and cargo trucks that operate on the airport taxiways may also be running a GPS application. Thus, any plane or other transport using an electronic map system 100 may use a "computing device" that provides an electronic map system. However, the present invention will hereinafter be explained with reference to one particular use of the computing device, i.e., in an airplane. The computing device, as used herein, may be portable, e.g., a handheld unit that is not attached to the airplane, removable, e.g. a laptop device that can be disconnected from the airplane, or affixed, e.g., connected and attached to the airplane. As such, the location of the computing device is generally equivalent to the position of the airplane. Hereinafter, the position of the computing device and the position of the airplane are considered to be the same, except as explained below. For instance, the location of the computing device may be the position of a GPS antenna receiving GPS signals. In further embodiments, the location of the antenna may be adjusted by some offset, e.g., 10 feet, to represent a location of a center of an airplane or other transport. Furthermore, the following embodiment describing the use of airplanes to enhance airport mapping are merely illustrative and not meant to limit the present invention to use with airplanes or aviation generally.

As airplanes land at or take-off from the airport, location data is collected and stored by the electronic map system 100. The location data provides a path of travel similar to the paths 110, 112, 114, 116, and 118 shown in FIG. 1. The path of travel shows the position of the computing device on the airplane at certain moments in time during the airplane's use of the airport. The path of travel of one or more computing devices on airplanes can show discrepancies in the electronic map, such as the discrepancies in the exemplary electronic map shown in FIG. 1. The discrepancy 120 shows three planes that appear to have traveled over and across different infield portions of the airport. An airport infield is usually a grassy or dirt area between or beyond the taxiways and runways where airplanes do not travel. Thus, it is likely that the electronic map 104, at least in the areas denoted by the circle 120, is incorrectly shown. A second discrepancy 122 is shown in another part of the airport. In this example, only a single airplane appears to have crossed a different section of the airport infield.

In one embodiment of the present invention, the discrepancy data is collected and sent to the electronic map creator. Upon identifying the discrepancies, the electronic map creator can alter the electronic map 104 to better align the electronic map 104 with the location data and then send the improved maps to the users. One skilled in the art will recognize that this discrepancy identification and elimination method and system may be applied to other electronic maps, such as the maritime electronic maps of seaways and coast lines. Thus, although the present invention is explained with reference to identifying and correcting discrepancies in airport maps, one skilled in the art will recognize that the systems and methods of the present invention are not limited to such embodiments.

Figure 2:
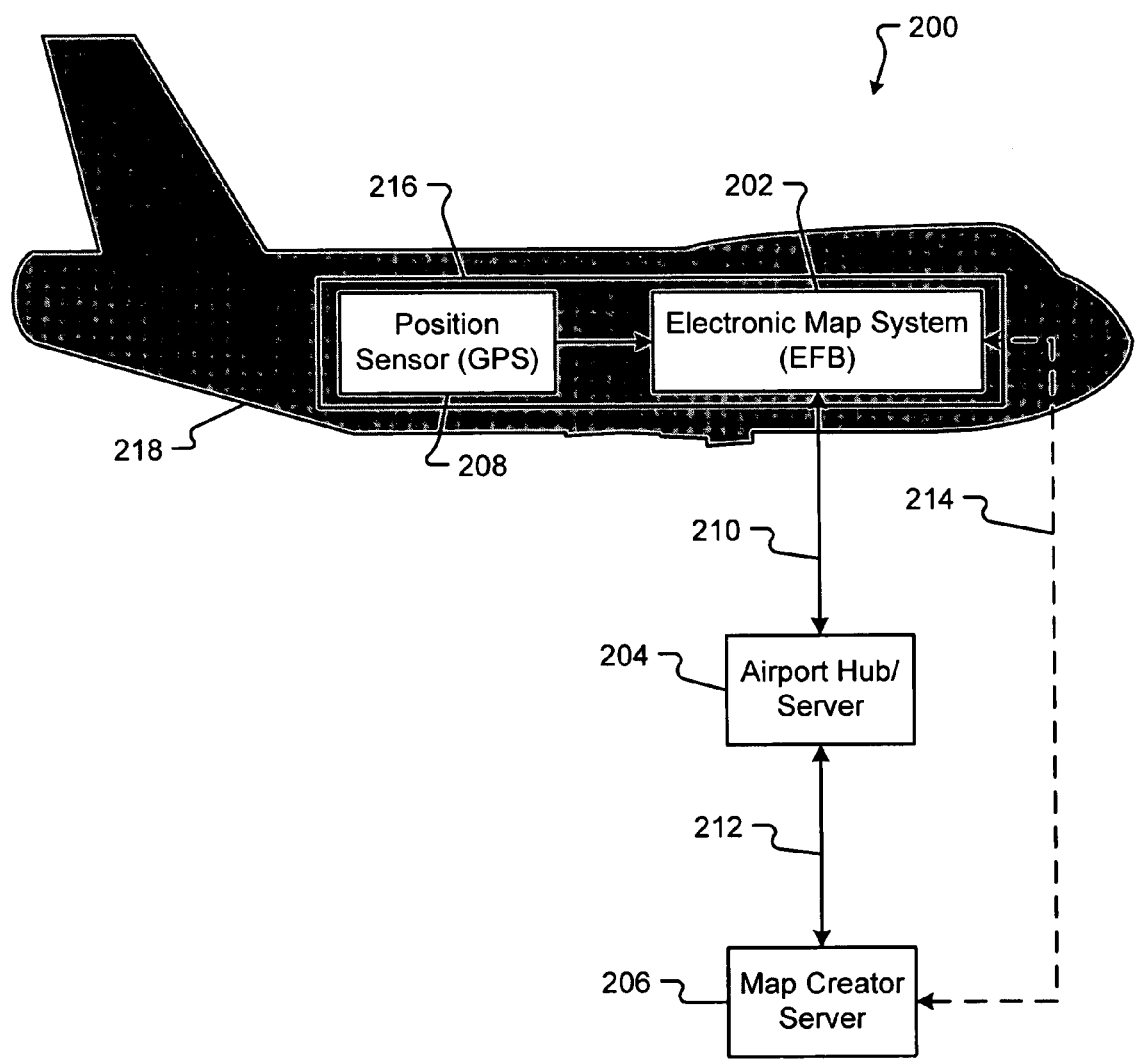
FIG. 2 is a functional diagram of an advantageous embodiment illustrating a discrepancy collecting and reporting system according to the present invention.

A block diagram of an exemplary system 200 capable of both recording and reporting location data is shown in FIG. 2. The electronic map system 202, the airport hub/server 204, the map creator server 206, and the position sensor 208 are all preferably computer systems. As used herein, a "computer system" or "computing device" shall be construed broadly and is defined as one or more devices or machines that execute programs for displaying and manipulating data, text, graphics, symbols, video, and/or audio. In one embodiment, the electronic map system 202 is an EFB and the position sensor 208 is a GPS receiver. The electronic map system 202 and the position sensor 208 are incorporated into a computing device 216, such as a device that is mounted on an airplane or a portable device that may be carried onto an airplane by a pilot.

The computing device is used on a type of "transport" 218, such as an airplane, automobile, or watercraft.

The electronic map system 202 displays information, such as display screen 102 (FIG. 1). The electronic map system 202 receives location data from the position sensor 208 (e.g., a GPS receiver), and that location information is converted into data that can be displayed on the geo-referenced, electronic map, such as electronic map 104 (FIG. 1). In embodiments, the electronic map system 202 and position sensor 208 comprise the computing device 216. In addition, the location data is recorded on a recording device, as explained below with reference to FIG. 3. In embodiments of the present invention, the location data is recorded periodically (e.g., a location position may be recorded once every one second). The periodic locations are reported to the electronic map creator server 206.

In one embodiment, the electronic map system 202 initially reports the location data to an airport hub/server 204. The electronic map system 202 and the airport hub/server 204 are communicatively coupled by connection 210. Similarly, airport hub/server 204 is communicatively coupled to a map creator server 206 by connection 212. In alternative embodiments, the electronic map system 202 is communicatively coupled to the map creator server 206 directly by connection 214, and thus, bypasses the airport hub/server 204. In various embodiments, connections 210, 212, and/or 214 may comprise either wired connections or wireless connections, such as radio communications, satellite communications, or cellular communications. For example, after the airplane containing the computing device 216 has landed, a wire or cable may be connected to the electronic map system 202 that allows the electronic map system 202 to upload the airplane's location data to the airport hub/server 204. In another embodiment, a storage device, such as a USB memory device, stores the location data. At the conclusion of a flight, the memory device may be removed from the airplane or EFB and connected to the airport hub/server 204, where the airport hub/server 204 copies or uploads the location information from the memory device. In another embodiment, a separate, portable memory device, such as a USB memory stick that is not normally connected to the electronic map system 202, is connected to the electronic map system while the download occurs. The location information is uploaded to the portable memory device during the download. The portable memory device may then be shipped to the map creator. In still other embodiments, the electronic map system 202 (or the entire computing device 216) is taken from the airplane and connected, such as through a docking station, to a network where the location data is uploaded.

In one embodiment, the electronic map database of the computing device 216 is updated periodically, such as every month. When the map database is updated, the stored location data may be uploaded to the map creator server 206 during or approximately at the same time as the new map database is downloaded. Thus, if the computing device 216 requires servicing to download the new map database, the periodic access to the electronic map system 202 provides regular opportunities to upload a large amount of location data for that computing device 216 (i.e., location data and discrepancy reports for a plurality of airports over a certain period of time). Thus, regardless of the type of connection, communication method, and/or system, the stored location data for the computing device 216 is periodically reported to the map creator server 206. One skilled in the art will recognize that the method of uploading quality control data, such as the location data or discrepancy data, during a download of updates to the system can be used to improve the accuracy of other aviation or navigation systems. Thus, the examples directed at electronic map systems are not meant to limit the invention to those embodiments but are provided merely for illustration.

Alternative embodiments of the present invention may utilize a wireless system to report location data to the airport hub/server 204. For example, some airports are now equipped with an airport communications addressing and reporting system (ACARS). The ACARS system is a digital data link system that transmits data by a VHF radio signal. Each airplane has its own unique identifier, similar to a web address used with the world wide web, which allows the airplanes to receive and transmit data over the ACARS system. In embodiments, the location data may be transmitted to an airport hub/server 204 connected to the ACARS system via one or more ACARS transmitting and receiving stations. In other embodiments, the wireless connection is a satellite link between the airplane and either the airport hub/server or the map creator.

The location data is delivered to the map creator server 206 via a communications link 212 and/or 214. In embodiments, the airport hub/server 204 transfers the location data over an intranet or internet, such as the World Wide Web, to a map creator server 206. The transmission of the data again may be by a wired or wireless connection, and may also include shipping a storage device to the map creator, as well as other means known to those skilled in the art. In other embodiments, a system, such as a wide area network, functions to transmit data from the electronic map system 202 on the airplane directly to the map creator server 206, as shown by communications link 214. One skilled in the art will recognize other methods of reporting location data to the airport hub/server 204 or to the map creator server 206, such as cellular transmission, satellite transmission, copying data from a hard drive, or the like.

Figure 3:
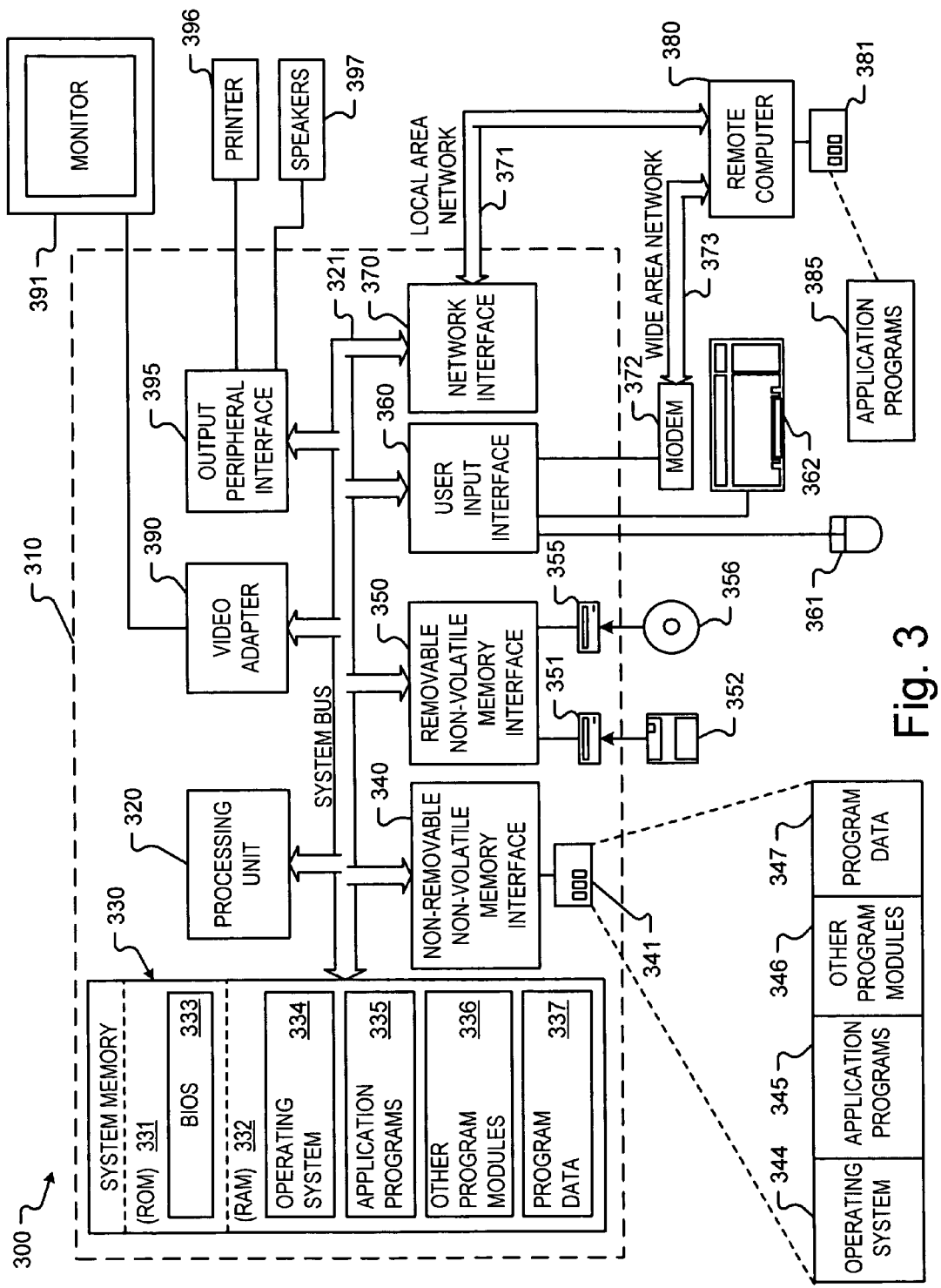
FIG. 3 is a functional diagram of an advantageous embodiment of a computing environment and a basic computing device that operates a location data collection application, an airport hub/server, and/or a map creator server according to the present invention.

The electronic map system 202, airport hub/server 204, and map creator server 206 preferably comprise computer systems. An example of a suitable computing system environment 300, which may be implemented as the electronic map system, airport server, or map creator server is illustrated in FIG. 3. The computing system environment 300 is only one example of a suitable computing environment and is not intended to suggest any limitation as to the scope of use or functionality of the invention. Neither should the computing environment 300 be interpreted as having any dependency on or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary computer system 300 for implementing the invention includes a general purpose-computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus. In an exemplary embodiment, the bus architecture is a Universal Serial Bus, which can connect together various components or computer peripherals.

Computer 310 typically includes a variety of computer readable media. Computer readable media can be any available media that can be accessed by the computer 310 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, USB memory storage devices, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 330 includes computer storage media in the form of volatile and/or nonvolatile memory, such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337; an electronic map, such as electronic map 104, would be stored as program data 337 and displayed from RAM 332.

The computer 310 may also include other removable/non-removable, volatile/nonvolatile computer storage media. By way of example only, FIG. 3 illustrates a computer 310 with a non-removable, non-volatile memory interface 340 that reads from or writes to non-removable, nonvolatile magnetic media 341, such as a hard drive. Computer 310 may also include a non-volatile memory interface 350 that reads from or writes to a device 351, such as a disk drive, that reads from or writes to a removable, non-volatile media 352, such as a magnetic disk. In addition, the computer 310 may include an optical disk drive 355 that reads from or writes to a removable, nonvolatile optical disk 356, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, USB memory storage devices, solid state RAM, solid state ROM, and the like. The hard disk drive 341 is typically connected to the system bus 321 through a non-removable memory interface, such as interface 340, and flash memory drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules, and other data for the computer 310. For example, hard disk drive 341 is illustrated as storing operating system 344, application programs 345, other program modules 346, and program data 347, which can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through a user input interface 360 connected to user input devices, such as a keyboard 362 and pointing device 361, commonly referred to as a mouse, trackball, or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interfaces and bus structures, such as a parallel port, game port, or a universal serial bus (USB).

A monitor 391 or other type of display device is also connected to the system bus 321 via an interface, such as a video interface 390. In addition to the monitor 391, the computer 310 may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device, or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks, such as wireless networks. Such networking environments are commonplace in offices, enterprise-wide computer networks, intranets, and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device 381. By way of example, and not limitation, the remote application programs 385 reside on memory device 381. It will be appreciated that the network connections shown are exemplary and other means of establishing a communications link between the computers may be used.

Referring again to FIG. 1, in embodiments of the present invention, the electronic map is a geo-referenced map image. Geo-referencing is a method of assigning "real world" coordinates, such as latitude and longitude, to an object and displaying that object within a "map space" having a smaller scale, correlated coordinate system in the same relative position as the actual, physical location of the object on the earth. The "map space" is the map environment having the correlated coordinate system that displays objects and their representative position according to location information or location data. In embodiments, each object in the electronic map display 104 has a set of coordinates that represents a certain latitude and longitude of a position on the surface of the earth. For example, an end of the runway 124 has a certain known latitude and longitude on the surface of the earth. The known longitude and latitude are translated into correlated coordinates in the map space. The object representing the runway is placed in the coordinate system of the map space such that the end of the runway 124 is in the same place as the actual, physical position of the end of the runway on the surface of the earth.

In embodiments, GPS data provides the location data or location information to display a location of a device within the map display, or map space. For instance, the latitude and longitude is derived from a received GPS signal, and the location is displayed within the electronic map 104 as oriented or positioned according to the coordinates. Thus, moving objects having a GPS or other position sensor can be shown as moving within or through the electronic map display 104. If location data or information is recorded periodically over a period of time, a path of travel is created showing the path of movement of an object within the map display 104. Such exemplary paths of travel 110, 112, 114, 116, and 118 for several airplanes are shown in the electronic map display 104.

Generally, the geo-referenced electronic map displays the location of an object according to the position grid used for the electronic map. However, the actual position of each object within the map display 104 is not always known. To create the maps, a map creator may know the position of objects relative to other objects in the map display. For instance, if a first object in the map display 104 is known to have a position 50 meters south of a second object, the geo-referenced map displays the first object's position in the electronic map 104 such that it appears the equivalent of 50 meters south of the second object. Further, parts of the map display may be drawn according to known dimensions of an object as well as a known orientation of a first object relative to a second object, etc.

To create the electronic map 104, a map creator obtains the dimensions or layout of the area to be mapped. In some embodiments, the map creator receives an aerial or satellite image of the airport. In other embodiments, the map creator receives plans or blueprints for the airport that are used to create the geo-referenced electronic map. The plans or image is input into the map system and then converted into an electronic map 104. Generally, at least one or more objects in the plans or image have a known position on the surface of the earth. The known positions are usually determined by a survey. The geo-referenced airport map 104 is created by scaling and orienting the generated map so that the one or more objects (such as the end of the runway 124) are located at their known positions. As the dimensions (such as dimensions 126 and 128) of certain objects (such as the infield portion 130) to be displayed in the airport map 104 are known or determined, the rest of the airport map 104 is laid out with reference to the known position locations. For example, a layout vector, such as layout vector 132, may be known for an object, such as object 130. The layout vector has a known length and a predetermined angle from north, such as angle 135. With the known length and angle, an object is placed in the map space at the appropriate position. As such, the geo-referenced airport map 104 may be created using an overhead image or detailed plans together with the known positions of a few fixed objects. One skilled in the art will recognize other means of creating and generating a geo-referenced electronic map 104.

Figure 4:
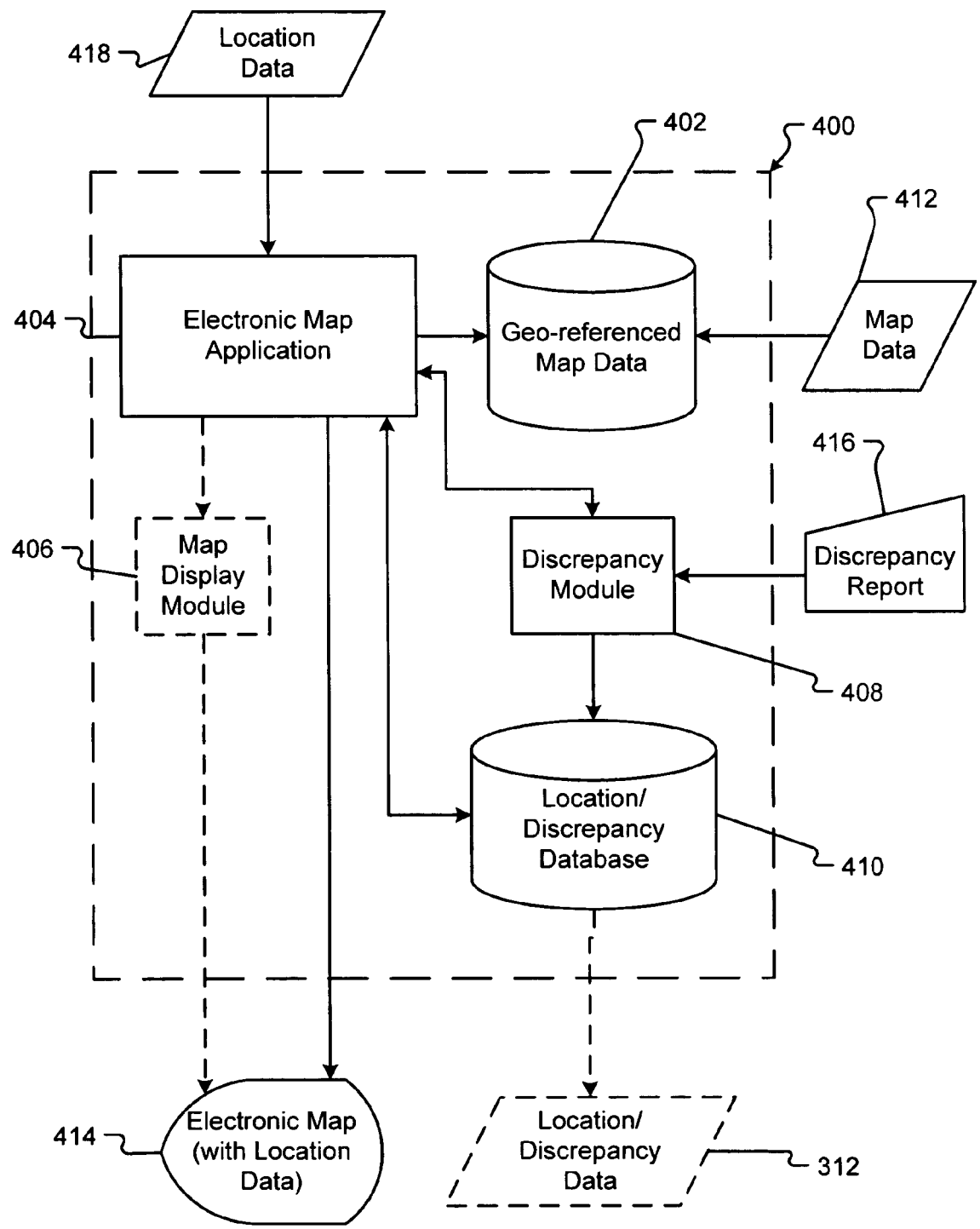
FIG. 4 is a functional diagram of an advantageous embodiment of a system for collecting location data and determining discrepancies according to the present invention.

An exemplary electronic map system 400 having software system modules is shown in FIG. 4. In embodiments of the present invention, the electronic map system 400 includes, but is not limited to, a geo-referenced map database 402 including one or more electronic airport maps, an electronic map application 404, a map display module 406, a discrepancy module 408, and a discrepancy database 410. The geo-reference map database 402 stores one or more geo-referenced electronic maps of one or more locations. The map database 402 may be updated periodically with map data 412 from a map creator server, such as map creator server 206 (FIG. 2).

An electronic map application 404 receives the geo-referenced map data from the map database 402. In addition, the electronic map application 404 receives location information or data 418 from a position sensor, such as position sensor 208 (FIG. 2). The electronic map application 404 determines the position of the computing device in the geo-referenced map according to the received location data 418. The electronic map application 404 passes information about the electronic map and the position of the computing device in the airplane to a map display module 406, which renders the map with the location data 418 and provides the rendered electronic map and location data 414 to a display device.

In one embodiment, the electronic map application 404 is a TPA application of the EFB. The TPA application determines the position of an airplane on the airport taxiway or runway and provides that information to the display module 406. Embodiments of the TPA application are described in U.S. patent application Ser. No. 10/369,187, entitled "Airport Taxiway Naviagtion System," and filed by Reagan Doose, Richard Ellerbrock, Glade Hulet, John Jaugilas, and Matthew Majka, filed on Feb. 19, 2003. This prior application is assigned to Jeppesen Sanderson, Inc., the assignee of the present application, and is hereby incorporated by reference in its entirety. In one embodiment, the electronic map application 404 stores all location data 418 to the location/discrepancy database 410. The location data 418 is then passed to a map creator server. The map creator server can then evaluate the location data 418 to identify discrepancies.

In other embodiments, the TPA application or other electronic map application 404 provides the geo-referenced map data and location data 418 to a discrepancy module 408. The discrepancy module 408 determines if there is a discrepancy between the geo-referenced map and the location data 418. In one embodiment, the discrepancy module receives a discrepancy report 416 from the user or pilot. For example, the pilot notices that the displayed location of the computing device in the airplane is shown as different from the actual, physical position of the airplane, such as being within an infield portion of the airport. The pilot then communicates with an input device, such as by pushing a button on the electronic map system 100, to send a discrepancy signal to the discrepancy module 408. The discrepancy module 408 then stores the discrepancy report, which includes identification data for the geo-referenced map and the location data 418, in the location/discrepancy database 410.

In another embodiment, the discrepancy module 408 identifies and determines a discrepancy automatically. For instance, the geo-referenced electronic map may have predefined boundary regions so that any location data 418 shown within the boundaries is determined to be correct. However, if a computing device position is shown outside the boundary region, a discrepancy is automatically identified. While the use of boundaries may be sufficient to determine discrepancies with relatively low-precision GPS device, devices having higher precisions may provide indications of inaccuracies even without crossing one of these boundaries. That is, given the relatively wide dimensions of modern airport taxiways, one embodiment of the present invention may determine a discrepancy by measuring the distance between location data 418 and a centerline of a taxiway or other area in the airport map. For instance, if there is a distance of 40 meters between the centerline of the taxiway and the edge of the taxiway, and a location data indicates a distance of 30 meters from the centerline, a discrepancy may be deemed likely even though a boundary line has not been crossed. Further, a statistical analysis of all the location data for a specific taxiway (along with an analysis of the accuracy of the GPS units reporting the data) may be used to determine when a reported distance from the centerline is statistically significant such that it indicates a position error within the map database. For example, if the location data is not highly accurate, e.g., has one sigma accuracy of ±15 meters, then a reported error that is 30 meters from the centerline of the taxiway may not be determined to be statistically significant enough to automatically determine a discrepancy. However, if the location data has one sigma accuracy of ±5 meters, then the reported error of 30 meters from the centerline will be considered to more likely indicate an error in the mapping database.

Once a discrepancy has been identified, the location data 418 and other like data is automatically recorded in the location/discrepancy database 410 for the discrepancy only. In this way, only data or information about discrepancies is reported to the map creator server. Thus, the amount of data that is stored and ultimately transferred is minimized.

In further embodiments, the determination of a discrepancy also generates an upload trigger. An upload trigger is a flag or other data that signals an upload of discrepancy data to the map creator is necessary. In one embodiment, the upload trigger forces the electronic map system to automatically connect with the airport hub/server to upload discrepancy data to the map creator. In other embodiments, a user interface signal, such as an illuminated lamp or an audible sound, is produced to alert the pilot to connect the electronic map system to the map creator for an update. In this way, smaller portable electronic map systems may still store and report discrepancies without using the limited memory of such systems to store discrepancy data for long periods of time.

Further, the upload trigger, in some embodiments, also produces a download event. For instance, if a discrepancy is determined, the upload trigger forces an automatic upload of the discrepancy data and also forces a download or a request for download of any updated maps. By forcing a download of updated maps, the electronic map system can obtain an improved map that eliminates the discrepancy. In another embodiment, the upload trigger first requires a download of any new maps so that the discrepancy data can be compared with the new map. If the new map eliminates the discrepancy data, the upload trigger is cancelled and no discrepancy data is sent to the map creator. In another embodiment, the discrepancy data is sent, and the map creator determines if the discrepancy has previously been eliminated. If the discrepancy is eliminated, the map creator sends the updated map to the electronic map system. In this way, both the electronic map system and the map creator are prevented from communicating moot or out-of-date data.

In embodiments of the present invention, the location data stored to the location/discrepancy database 410 includes, but is not limited to, information about an airplane identifier, an airplane type, an airport for the location data, the date the location data was recorded, the locations at certain times, and the like. The location data may also be augmented with discrepancy information, such as a flag denoting a discrepancy with the airport map, identification of the location data that caused the discrepancy, and the like. Any or all of this location/discrepancy information can be reported to the map creator server.

In an alternative embodiment, a map creation system 400 of the map creator server, such as map creator server 206 (FIG. 2), having software modules is shown in FIG. 4. In this embodiment, the map data 412 represents the data, images, or plans used to generate the geo-referenced map data stored in the geo-referenced map database 402. The geo-referenced map data in the geo-referenced map database 402 is input into the electronic map application 404 to create electronic maps. In one embodiment, the location data 418 represents location data provided by a plurality of airplanes that is input and incorporated into one or more electronic maps. The electronic maps can be sent to a discrepancy module 408 to identify discrepancies. Identified discrepancies and the report data required to eliminate the discrepancies can be stored in a discrepancy database 410 to be provided to the electronic map application 404 to correct the electronic map(s). In another embodiment, the discrepancy module 408 receives discrepancy reports 416, such as the reports generated from a discrepancy module in a computing device in an airplane that identifies a discrepancy. The discrepancy reports 416 allow the discrepancy module to more quickly identify and eliminate electronic map discrepancies. After correcting a discrepancy, the electronic map application 404 sends the corrected electronic map 414 to the electronic map systems, such as electronic map system 202 (FIG. 2), of one or more airplanes. Other modules shown in FIG. 4, i.e., the objects shown with dashed lines, may not be included in this embodiment.

Each embodiment described above has certain advantages. For example, if the electronic map system 404 only collects position data and relays the location data to a map creator to both detect and eliminate the discrepancies, then the electronic map system in the airplane may require a relatively small amount of processing overhead. However, this embodiment may also increase the time required for finding and eliminating the map discrepancies because the map creator must process a great amount of location data from numerous airplanes to find the discrepancies.

In an alternative embodiment, the electronic map system may automatically review all incoming location data and determine discrepancies automatically. Thus, only location data showing discrepancies is sent to the map creator, which minimizes the map creator's effort in finding discrepancies. That is, the map creator can address reported discrepancies quickly without processing a relatively large amount of unneeded location data. However, this embodiment requires a relatively higher level of processing for the computing device onboard the airplane so that the electronic map system may be using valuable processing time and electrical power in trying to locate discrepancies (which may not be desirable in an aircraft environment where electrical power is at a premium).

In another alternative embodiment, if a pilot only reports those discrepancies that are more critical, neither the electronic map system not the map creator need waste valuable resources trying to find discrepancies, but rather may focus on fixing the more dangerous discrepancies that pilots deem important. For example, pilots may report critical problems, such as incorrectly designated taxiways or taxiway discrepancies that could lead to a runway incursion, that require an immediate correction. These problems are more critical than relatively benign discrepancies, such as the incorrect dimensions of a terminal building, where pilots are not relying on the electronic map to maintain the safe operation of the airplane. Yet, pilots may not report every discrepancy or even the most critical discrepancies. Therefore, using this scheme, the map creator may be unaware of problems and may be delayed in eliminating discrepancies for a longer time.

Figure 5:
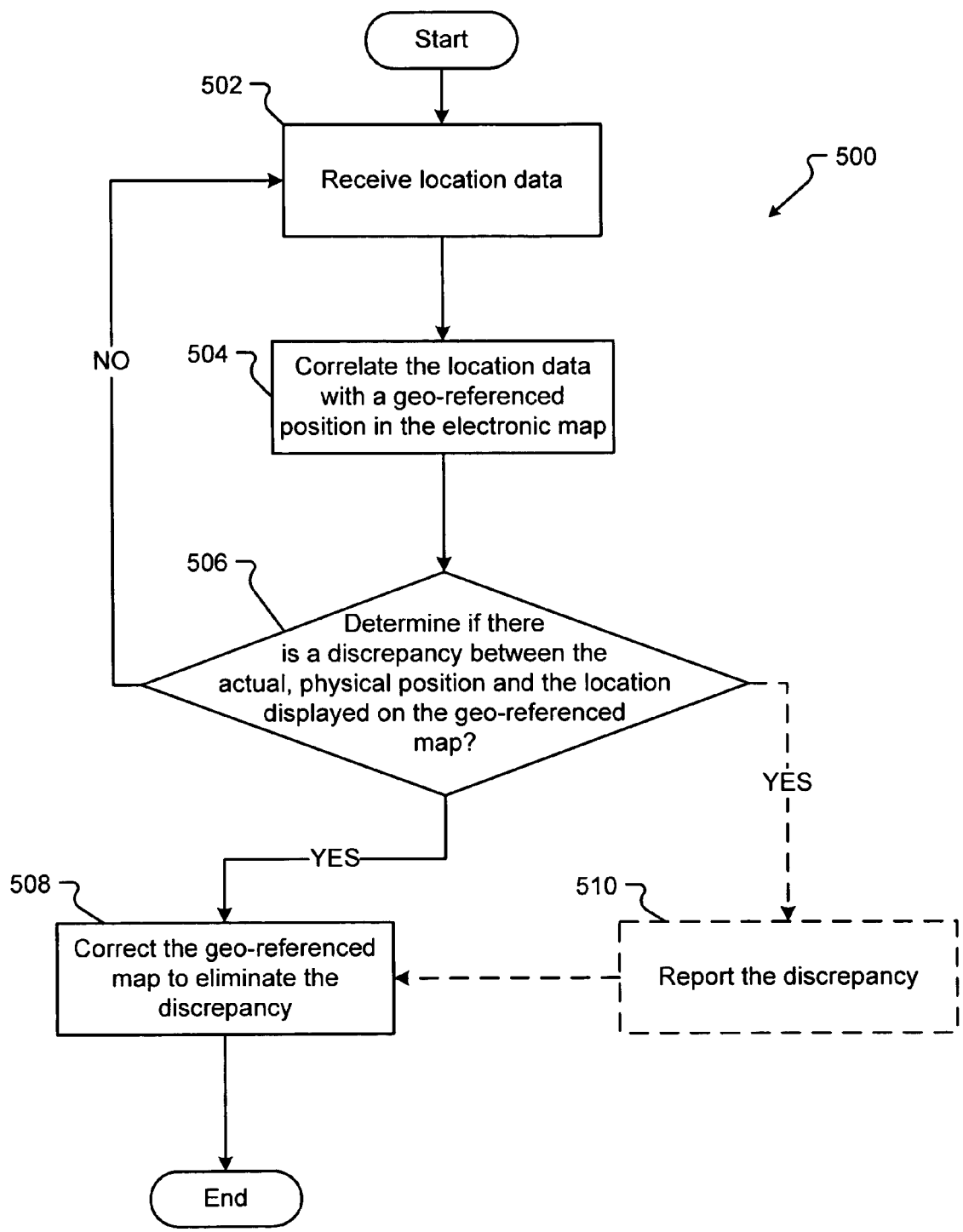
FIG. 5 is a flow diagram representing an embodiment of the present invention for identifying discrepancies in electronic maps using received location data.

An exemplary method 500 for identifying a discrepancy in an electronic map is shown in FIG. 5. In one embodiment, the electronic map system, such as electronic map system 202 (FIG. 2), identifies and reports the electronic map discrepancy to the map creator, such as map creator server 206 (FIG. 2). In other embodiments, location data, such as location data 418 (FIG. 4), is sent to the map creator and the map creator identifies the electronic map discrepancies. Thus, the exemplary method 500 can be executed in either the electronic map system or the map creator server.

In the exemplary embodiment of the method 500, receive operation 502 receives location data, such as location data 418 (FIG. 4). In one embodiment, the location data is basic, unprocessed position sensor data, such as GPS position data. The position data is converted into geo-referenced location data to use in one or more electronic maps, such as electronic map 104 (FIG. 1). In other embodiments, the location data received is already geo-referenced.

In some embodiments, the location data contains other information. For example, the location data may include information about the airplane that recorded and is reporting the data, such as the type of airplane or the location of the position sensor 218 (FIG. 2) on the airplane, as well as other information. This additional information is useful in studying the location data and compiling statistics about the data. For instance, a certain type of plane, such as a Boeing 737, may locate the position sensor 218 (FIG. 2) a predetermined number of feet perpendicular to the center axis of the airplane. Thus, the airplane may be in the center of a taxiway but the location data will show the plane some distance from the center of the taxiway. Using this additional information, the correction of "false" discrepancies may be avoided. This situation represents one example when the computing system position is not generally equivalent from the position of the airplane. One skilled in the art will recognize other situations when the position of the computing device and the airplane may differ.

Correlate operation 504 correlates the geo-referenced position data, derived from the location data, with a geo-referenced position in the electronic map. In other words, the position within the geo-referenced map space is determined for the location data. In one embodiment, the correlate operation 504 generates statistics relating to the receipt of large amounts of data from a plurality of computing devices, each sending location data to the map creator server. In one embodiment, the statistics include calculating a mean path for all of the various travel paths in a given map region. Thus, while there will undoubtedly be some variation in the paths used by the airplanes having the computing devices, the mean path provides an approximation of where the center of any given path of travel is located. In further embodiments, the distribution of the paths of travel can approximate the amount of variation between the airplanes' paths. The statistics may also include the mean paths for different types of airplanes (i.e., for each type of aircraft), where each type of airplane may have a different position for the position sensor.

The determination operation 506 determines if the geo-referenced position of the location data (or the statistical mean of the location data) produces a discrepancy between the geo-referenced position and the actual, physical location of the computing device or the airplane containing the computing device. An embodiment of the determine operation 506 is discussed in more detail below with respect to FIG. 6. If a discrepancy is not found, the flow follows the NO branch to receive additional data in operation 502. However, if a discrepancy is found, the flow follows the YES branch to the correct operation 508. Operation 508 corrects the electronic map to eliminate the detected discrepancy. An exemplary embodiment of the correct operation 508 is explained in more detail below with respect to FIG. 7.

Alternatively, if the method 500 is performed in an electronic map system, such as system 100, the flow branches from the determine operation 506 to a report operation 510. Report operation 510 reports the discrepancy to a separate correct operation 508 that is executed in a separate computer (e.g., the map creator server 206 in FIG. 2) in this embodiment. In one embodiment, the electronic map system reports the discrepancy to the map creator server 206 (FIG. 2) either directly or through one or more intermediary systems, such as an airport hub/server 204 (FIG. 2).

Figure 6:
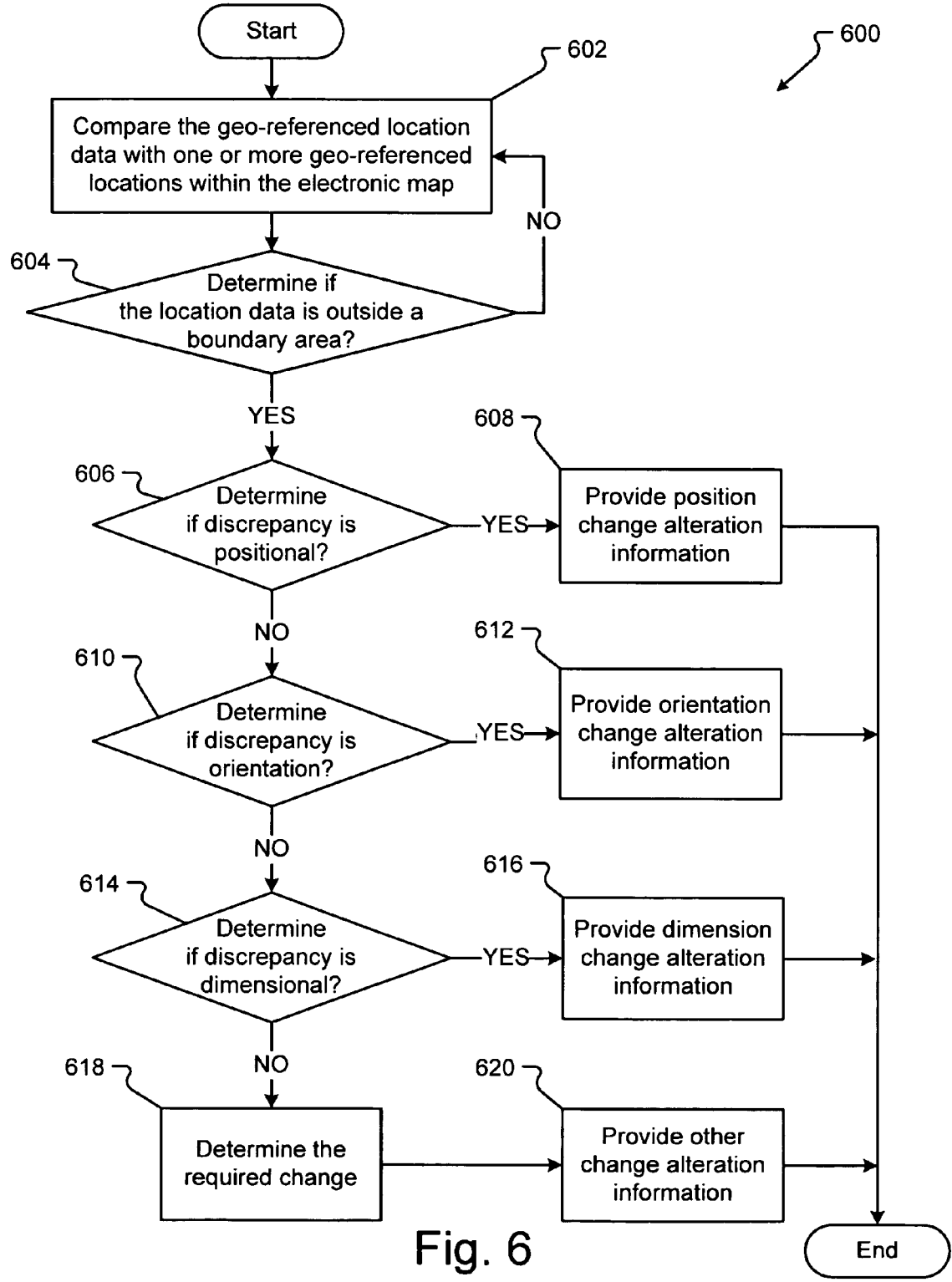
FIG. 6 is a flow diagram representing an embodiment of the present invention for identifying and typing a discrepancy in an electronic map.

An exemplary method 600 for determining a discrepancy is shown in FIG. 6. Operation 602 compares the received geo-referenced location data, such as location data 418 (FIG. 4), to one or more geo-referenced locations in the electronic map, such as electronic map 104 (FIG. 1). In one embodiment, the geo-referenced location data is compared to a boundary. For example, the edge of a taxiway or other fixed object (such as a terminal building or hanger) in the electronic map may constitute a boundary that is compared to the geo-referenced location data. In embodiments, geo-referenced location data is valid if located on one side of the boundary, such as when location data shows the aircraft position on or within the taxiway. If data points are detected on the incorrect side of the boundaries, a discrepancy may be deemed to have occurred. In another embodiment, the geo-referenced location data is compared to a reference point having a known location. For example, the end of the runway 124 in FIG. 1 may be used to compare to the geo-referenced location data. An angle from north, such as angle 135, and a distance may be generated from the end of the runway 124 to each geo-referenced location data point. Certain predetermined angle and distance values may then be used to map the boundary areas so that data points detected within these regions would also be deemed to denote a discrepancy.

Determine operation 604 determines if the geo-referenced location data point is outside the boundary area. If the data point is not outside the boundary region, the flow loops back to the compare operation 602. If the data point is outside the boundary region, the flow branches YES to a series of steps that determine the type of discrepancy.

Operation 606 determines if the discrepancy is a position discrepancy. A position discrepancy involves an object within the electronic map that is located in the incorrect position. In one embodiment, the position discrepancy is located by finding boundary violations in two related areas. For example, in FIG. 1, a first discrepancy 120 occurs when two airplane travel paths 110 and 114 cross a first boundary 138 of a first object 140. A related discrepancy occurs when one airplane path 112 crosses over a similar boundary 142 of a second object 144. These related discrepancies indicate that the first object 140 has correct dimensions but is positioned incorrectly and that the second object 144 is either incorrectly positioned or has incorrect dimensions. One skilled in the art will recognize other methods of identifying incorrectly positioned objects according to the location data. If the discrepancy is a position discrepancy, the flow branches YES to report operation 608. Report operation 608 creates data about the position discrepancy and sends the report. In one embodiment, the discrepancy data includes, but is not limited to, the type of discrepancy and the location of the discrepancy. If the discrepancy is not a position discrepancy, the flow branches NO to determine operation 610.

Operation 610 determines if the discrepancy is an orientation discrepancy. An orientation discrepancy involves an object or objects, within the electronic map, that are oriented incorrectly within the map space. For instance, the airport map is not in the correct angle relative to north in the map space. In one embodiment, the orientation discrepancy is located by finding boundary violations in a plurality objects in the same related areas. For example, if several objects show a boundary violation in the same position relative to the object, the entire collection of objects may be oriented incorrectly. One skilled in the art will recognize other methods of identifying incorrectly oriented objects according to the location data. If the discrepancy is an orientation discrepancy, the flow branches YES to report operation 612. Report operation 612 creates data about the orientation discrepancy and sends the report. In one embodiment, the discrepancy data includes, but is not limited to, the type of discrepancy and the location of the orientation discrepancy. If the discrepancy is not an orientation discrepancy, the flow branches NO to determine operation 614.

Operation 614 determines if the discrepancy is a dimensional discrepancy. A dimensional discrepancy involves an object within the electronic map that has the incorrect dimensions. In one embodiment, the dimension discrepancy is located by finding a boundary violation in a first area but without a complementary boundary violation at another boundary. For example, in FIG. 1, a discrepancy 122 shows an airplane travel path 118 crossing a first boundary 146 of an object 148. However, a second airplane travel path 116 fails to cross an opposite boundary of the object 148. This discrepancy may indicate that the object 148 has an incorrect length dimension. One skilled in the art will recognize other methods of identifying incorrectly dimensioned objects according to the location data. If the discrepancy is a dimension discrepancy, the flow branches YES to report operation 616. Report operation 616 creates data about the dimension discrepancy and sends the report. In one embodiment, the discrepancy data includes, but is not limited to, the type of discrepancy and the location of the discrepancy.

While most discrepancies are one of the three types described above (i.e., position, orientation, or dimension), operation 618 attempts to determine the type of discrepancy if the discrepancy does not fall into one of the three above-described types. For instance, a discrepancy may be a designation discrepancy. A designation discrepancy occurs when some part of the electronic map, such as the name or number of a taxiway, is incorrectly labeled. For example, taxiway "A" is incorrectly labeled or designated in the electronic map as taxiway "B." Information about the discrepancy is recorded and provided to the report operation 620. Report operation 620 creates data about the discrepancy and sends the report. In one embodiment, the discrepancy data includes, but is not limited to, the location of the discrepancy.

Figure 7:
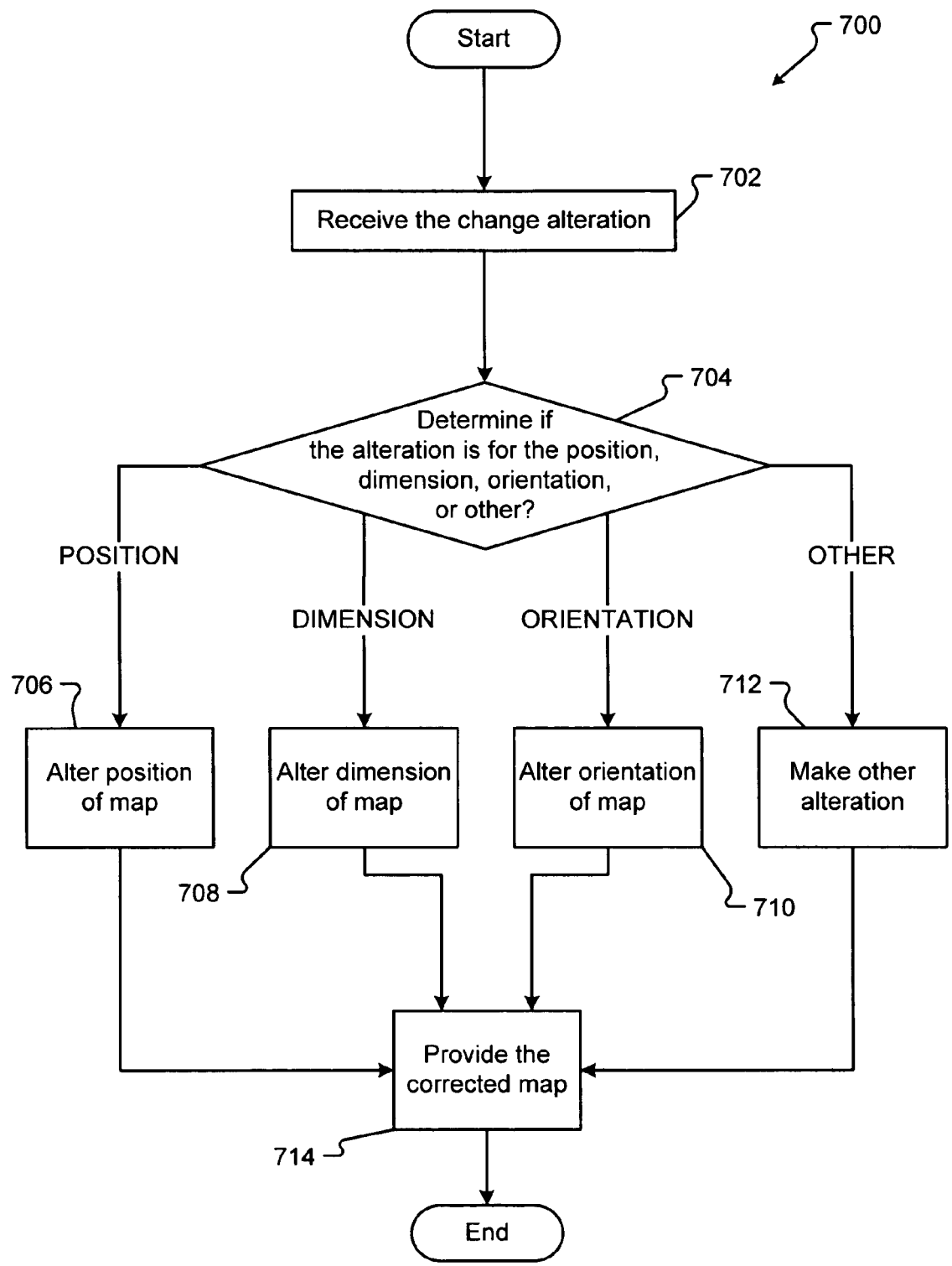
FIG. 7 is a flow diagram representing an embodiment of the present invention for correcting and/or eliminating discrepancies in an electronic map.

An exemplary embodiment of a method 700 for correcting an electronic map, such as electronic map 104 (FIG. 1), using location data, such as location data 418 (FIG. 4), is shown in FIG. 7. Receive operation 702 receives a discrepancy report, such as the reports generated and described in conjunction with FIG. 6. In embodiments or the present invention, the discrepancy report is one of a position discrepancy report, an orientation discrepancy report, a dimension discrepancy report, or the like. Determine operation 704 determines the type of discrepancy. In one embodiment, the data in the discrepancy report is searched to determine the type of discrepancy.

If the discrepancy is a position discrepancy, the flow follows the POSITION branch to operation 706 which corrects the position discrepancy. In embodiments of the present invention, the discrepancy report specifies the type of discrepancy, the location of the discrepancy, and the information about how to eliminate the discrepancy. In other embodiments, the alter operation 706 determines how to eliminate the discrepancy. The information about how to eliminate the discrepancy can include how far an object needs to be moved in the map space to eliminate the discrepancy. For example, a discrepancy represents a boundary crossing of the average path of travel into an object by 10 meters in the map space. Thus, to eliminate the discrepancy, the object is moved a distance that represents 10 or more meters in the map space. To ensure that the boundary crossing would seldom occur, the statistical analysis of the boundary crossing may show that 99% of the boundary crossings represented a discrepancy of 12 meters or less. Thus, moving the representation of the object a distance of 12 meters in the map space would eliminate 99% of the discrepancies reported.

If the discrepancy is a dimension discrepancy, the flow follows the DIMENSION branch to operation 708 which operates similarly to the above-described operation 706. However, in the case of alter operation 708, the correction to the electronic map requires a dimension change. As such, the information about how to change the electronic map to eliminate the discrepancy can include a change in dimension, such as a shrinking of the length or width of an object by a certain amount. For example, if the boundary crossings of the object occur at one edge of the object and 99% of those encroachments are a distance that represents 10 meters of less, the edge of the object incurring the boundary crossings is brought closer to the object's opposing edge by a distance that represent 10 meters in the map space.

If the discrepancy is an orientation discrepancy, the flow follows the ORIENTATION branch to operation 710. While alter operation 710 operates similarly to operations 706 and 708, the correction to the electronic map requires an orientation change. As such, the information about how to eliminate the discrepancy can provide a change in orientation, such as shifting objects by a certain amount. For example, if the encroachments of a group of objects occur at one edge of the objects, and 99% of those encroachments are a distance that represents 20 meters or less in the map space, the objects as a group are reoriented by moving the set of objects a distance that represents 20 meters or less in the map space.

If the discrepancy is an "other" discrepancy, the flow follows the OTHER branch to alter operation 712 where the correction to the electronic map requires some "other" type of change. As such, the information provided may focus on the existence of the discrepancy rather than on suggestions for eliminating the discrepancy. In some embodiments, a person is informed of the discrepancy and that it requires some other type of change. The person can then investigate the positional data and determine what change will eliminate the discrepancy.

Operation 714 receives the corrected map from the "alter" operations 706, 708, 710, or 712, and then transmits the altered map to the users of the electronic map. In one embodiment, the user databases of the electronic maps are periodically updated. As such, when an update occurs, the altered electronic maps are sent to the users. In embodiments, the provide operation 714 transmits the altered maps to the map databases, such as database 402 (FIG. 4), over a connection, such as connection 214 (FIG. 2).

The embodiments of the methods and systems for eliminating discrepancies in electronic maps provide numerous advantages. For instance, electronic maps that are created with less accurate data, such as those maps that are based on airport plans as opposed to overhead imagery, can be reviewed using actual location data. Thus, as more airplanes use the smaller airports and report location data for those airports, the airport maps may become more and more accurate.

In addition, the methods and systems provide various embodiments that have different advantages. The identification of discrepancies may be completed in the client applications, such as the electronic map system 202 (FIG. 2), or in server applications, such as the electronic map application 404 (FIG. 4) executed in a map creator server 206 (FIG. 2). The identification of the discrepancies may be based on location data from a plurality of airplanes provided to the map creator server or the discrepancies may be identified in the electronic map systems with only the discrepancy data sent to the map creator server. In some embodiments, the pilot may provide a discrepancy report, and, in other embodiments, the discrepancy is identified automatically. The alternative embodiments allow for different allocations of processing load and/or quicker identification and elimination of discrepancies, some of which may be considered as "critical" discrepancies.

Although the present invention has been described in language specific to structural features, methodological acts, and computer-readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A computer-based method for removing discrepancies from an electronic map of a defined area, the electronic map stored within a database, said method comprising:
    collecting and storing location data for a plurality of vehicles as they traverse the defined area;
    determining an actual path of travel within the defined area for each of the vehicles from the stored location data;
    combining the actual paths of travel into a mean travel path;
    identifying discrepancies between the mean travel path for the vehicles and a vehicle travel path within the defined area previously defined and stored within the electronic map; and
    updating the components within the database that constitute the electronic map such that an updated path of travel is defined to be proximate the mean travel path, should the identified discrepancies exceed a threshold.

2. A computer-based method according to claim 1 wherein identifying discrepancies comprises:
    performing a statistical analysis on the location data; and
    comparing at least one statistical value relating to the location data to the desired vehicle travel path stored in the electronic map.

3. A computer-based method according to claim 1 wherein collecting and storing location data for a plurality of vehicles comprises collecting GPS data from the vehicles as they traverse the defined area.

4. A computer-based method A method according to claim 3 wherein collecting GPS data from the vehicles as they traverse the defined area comprises includes applying an offset to the GPS data to compensate for a location of the GPS antenna with respect to a location of a center of a vehicle.

5. A computer-based method according to claim 1 further comprising identifying at least one of a positional, orientation, designation, or dimensional discrepancy between the actual paths of travel and the vehicle travel path defined and stored within the electronic map.

6. A computer-based method according to claim 1 wherein updating the components that constitute the electronic map comprises uploading discrepancy data to a creator of the electronic map.

7. A computer-based method according to claim 1 wherein updating the components that constitute the electronic map comprises alerting a user of the electronic map to connect a system that includes the electronic map to a creator of the electronic map for updating the map.

8. A computer-based method according to claim 1 wherein updating the components that constitute the electronic map comprises updating a position of at least one airport landmark on the electronic map based on the mean travel path.

9. A computer-based method according to claim 1 further comprising disbursing the updated electronic map to users of the electronic map.

10. A system for updating electronic maps, said system comprising a computer and a database, an electronic map stored within said database, said computer operable to:
    receive and store location data for a plurality of vehicles, the location data relating to the vehicles as they traverse a defined area;
    determine an actual path of travel within the defined area for each of the vehicles using the location data;
    combine the actual paths of travel into a mean travel path;
    identify discrepancies between the mean travel path for the vehicles and a vehicle travel path previously defined and stored within said database;
    define an updated vehicle travel path based on the mean travel path, should the identified discrepancies exceed a threshold, the updated vehicle travel path proximate the mean travel path; and
    update the electronic map within the database such that the updated vehicle travel path replaces the previously defined vehicle travel path.

11. A system according to claim 10 wherein to identify discrepancies, said computer is programmed to:
   perform a statistical analysis on the stored location data; and
   compare at least one statistical value relating to the stored location data to at least one value relating to the desired vehicle travel path stored in said database.

12. A system according to claim 10 wherein said computer is operable to receive GPS location data from a plurality of vehicles.

13. A system according to claim 12 wherein said computer is operable to apply an offset to the received GPS data to compensate for a location of the GPS antenna with respect to a vehicle center location.

14. A system according to claim 10 wherein to identify discrepancies, said computer is operable to identify at least one of a positional, orientation, designation, or dimensional discrepancy between the mean travel path and the desired vehicle travel path.

15. A system according to claim 10 wherein to define an updated desired vehicle travel path based on the mean travel path comprises uploading differences between the mean travel path and the desired path of travel to a creator of the electronic map.

16. A system according to claim 10 wherein to update the database such that the updated desired vehicle travel path replaces the desired vehicle travel path, said computer is operable to alert a user to update the map.

* * * * *